J. P. HOWIE.
EXPOSURE METER FOR CAMERAS.
APPLICATION FILED JUNE 15, 1917.

1,255,167.

Patented Feb. 5, 1918.

WITNESSES

INVENTOR
J. P. HOWIE,
BY
ATTORNEYS

UNITED STATES PATENT OFFICE.

JOHN P. HOWIE, OF COLUMBIA, SOUTH CAROLINA.

EXPOSURE-METER FOR CAMERAS.

1,255,167.  Specification of Letters Patent.  Patented Feb. 5, 1918.

Application filed June 15, 1917. Serial No. 174,907.

*To all whom it may concern:*

Be it known that I, JOHN PLATT HOWIE, a citizen of the United States, and a resident of Columbia, in the county of Richland and State of South Carolina, have invented an Improvement in Exposure-Meters for Cameras, of which the following is a specification.

My invention relates to improvements in exposure meters for cameras, and it consists in the constructions, combinations and arrangements hereinafter described and claimed.

An object of my invention is to provide a simple device which may be attached to the view finder of a camera by means of which the proper time for exposure of an object in light of any intensity, may be indicated.

A further object of my invention is to provide a simple form of exposure meter which is light in weight, convenient to manipulate, and ready at all times for instant use.

A still further object of my invention is to provide a device of the type described in which a rotatable disk is attached directly to the view finder and by means of which the proper time for exposure may be quickly and accurately ascertained.

Other objects and advantages will appear in the following specification, and the novel features of the invention will be particularly pointed out in the appended claims.

My invention is illustrated in the accompanying drawing, forming part of this application, in which—

Figure 1:
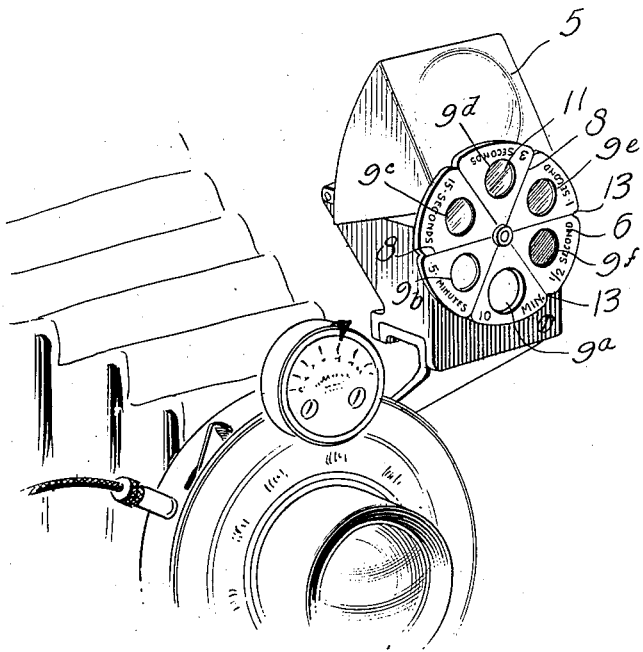
Figure 1 is a perspective view of the device as applied to a camera view finder.
Figure 2:
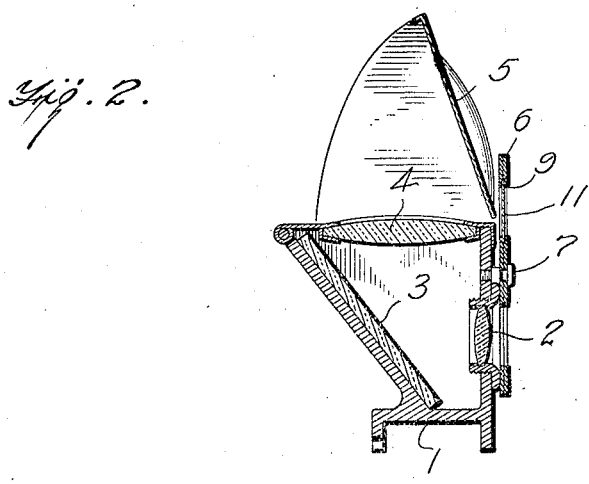
Fig. 2 is a sectional view through the device.

In carrying out my invention I may make use of an ordinary view finder, such as that shown in the drawings. This finder consists of a frame 1 having a lens 2 in the front thereof, a reflector 3 in the rear of the lens, a second lens 4, and a movable hood or shade 5. The latter is hinged to swing downwardly toward the lens 4 in the ordinary manner. The view finder thus far described is old and forms no part of the present invention except in so far as it coöperates to indicate the time of exposure as set forth hereinafter.

As will be seen from the drawings a disk 6 is pivotally mounted at 7 on the front of the view finder, preferably above the lens 2. This disk is divided into sections by radial lines 8. Each section is provided with an opening, such as those shown at $9^a$, $9^b$, $9^c$, $9^d$, $9^e$, and $9^f$. Any one of these openings is arranged to be brought into registration with the lens 2 by the rotation of the disk. The opening $9^a$ is larger than any of the other openings and is used for the purpose of centering the picture. The opening $9^b$ will permit a smaller amount of light to enter the view finder and hence the image will be less bright than with the opening $9^a$. The opening $9^c$ is covered with a sheet of light retarding material, such as colored celluloid, which may be of an orange color so as to permit certain portions of the rays of light to enter and to cut off other portions. The opening $9^d$ is covered by a light retarding sheet which, for instance, may be a green celluloid sheet. This will cut off more light than the orange. The opening $9^e$ has a covering which cuts off more light. This may be some such color as cerise, while the opening $9^f$ may be covered with a purple sheet which will shut off more light than any of the others.

Obviously if the disk be rotated the image will be less distinct with the opening $9^f$ in register with the lens 2 and more distinct progressively as the disk is rotated in a clock-wise direction, that is to say coming to the openings $9^e$, $9^d$, $9^c$, etc., successively.

From the foregoing description of the various parts of the device the operation thereof may be readily understood. In taking a view the opening $9^a$ is first brought into registration with the lens 2 and the picture is centered. Now in order to obtain the proper time for exposure the disk 6 is rotated in a counter-clock-wise direction until a position is reached in which the image is the faintest in the finder. Let us assume that this is the opening $9^e$. On looking at the time, as indicated on the edge of the disk, it is observed that the time of exposure is one second. If the image could have been seen if the opening $9^f$ were brought into registration with the lens then the time of exposure would have been one-half second, because the light would have been stronger and hence the time of exposure would have been less.

In order to show at a glance what particular opening is in registration with the lens 2 I preferably color the triangular sections between the radial lines 8 the same color as the sheet covering the opening, while in order to permit the disk to be easily rotated the latter is notched as at 13. With practice one will be able to associate the time of the exposure with the particular color, so that by rotating the disk and noting the faintest image in the view finder and then noting the color of the triangular section at the bottom of the disk, i. e. in registration with the lens 2, he can at once ascertain the time of exposure which is necessary.

It will be obvious that the time of exposure for interiors, which are dark, must be longer, and hence it will be seen that the faintest view which can be obtained in the view finder will probably be that either of the large opening 9ª or of the next opening 9ᵇ. As the light increases the disk may be rotated to a farther distance to get the faintest image in the view finder.

The device is simple in construction and light in weight. It is always in position to be operated, and will give the correct time exposure. The scales chosen are purely arbitrary ones, that is to say other colors having other light retarding values might be used and the corresponding times for exposure indicated on the respective sections without departing in the least from the spirit of the invention and the scope of the appended claims.

I claim:

1. The combination with a photographic view finder having a lens, of a disk having a series of openings, said disk being rotatable on a fixed pivot to bring said openings successively into registration with the lens, certain of said openings being provided with light retarding means, different amounts of light being cut off in different openings, and a legend for each opening indicating the time of exposure.

2. The combination with a photographic view finder having a lens, of a disk having a series of openings, said disk being rotatable on a fixed pivot to bring said openings successively into registration with the lens, certain of said openings being covered with light retarding plates, said plates being arranged to cut off different amounts of light for the different openings progressively, and a legend indicating the time of exposure disposed adjacent to each of said openings.

3. The combination with a photographic view finder having a lens, of a disk having a series of openings, said disk being rotatable on a fixed pivot to bring said openings successively into registration with the lens, certain of said openings being covered with light retarding plates, said plates being arranged to cut off different amounts of light for the different openings progressively, and a legend indicating the time of exposure disposed adjacent to each of said openings, said disk being provided with a series of radially extending lines dividing the disk into a series of triangular sections having an opening in each section, each of said triangular sections being of a distinctive color.

4. The combination with a camera having a view finder provided with a lens, of means disposed on the exterior of the view finder and movable with respect to the view finder, for cutting off predetermined amounts of light entering the view finder.

5. The combination with a photographic view finder having a lens, of a disk having a series of openings, said disk being rotatably mounted on a pivot secured to the view finder frame in front of the lens and said openings being arranged to be brought successively into registration with the lens, certain of said openings being covered with light retarding plates, said plates being arranged to cut off different amounts of light for the different openings progressively, a legend indicating the time of exposure disposed adjacent to each of said openings, said disk being provided with a series of radially extending lines dividing the disk into a series of triangular sections having an opening in each section, each of said triangular sections being of a distinctive color.

6. The combination with a photographic view finder having a lens, of a disk having a series of openings, said disk being rotatable on a fixed pivot to bring said openings successively into registration with the lens, certain of said openings being provided with light retarding means, so that different amounts of light are cut off by different openings, thereby modifying the entire amount of light received on the field of the view finder, at will.

JOHN P. HOWIE.